(12) United States Patent
Xu et al.

(10) Patent No.: US 10,828,965 B2
(45) Date of Patent: *Nov. 10, 2020

(54) METHOD OF ADJUSTING ELECTRONIC EXPANSION VALVE OF AIR CONDITIONER

(71) Applicant: QINGDAO HAIER AIR CONDITIONER GENERAL CORP., LTD., Qingdao (CN)

(72) Inventors: Wenming Xu, Qingdao (CN); Yu Fu, Qingdao (CN); Mingjie Zhang, Qingdao (CN); Fei Wang, Qingdao (CN); Beibei Xu, Qingdao (CN); Juke Liu, Qingdao (CN); Rongbang Luo, Qingdao (CN); Junjun Yuan, Qingdao (CN); Shuang Ding, Qingdao (CN)

(73) Assignee: QINGDAO HAIER AIR CONDITIONER GENERAL CORP., LTD., Qingdao (CN)

(*) Notice: Subject to any disclaimer, the term of this patent is extended or adjusted under 35 U.S.C. 154(b) by 95 days.

This patent is subject to a terminal disclaimer.

(21) Appl. No.: 16/314,853

(22) PCT Filed: Feb. 9, 2017

(86) PCT No.: PCT/CN2017/073139
§ 371 (c)(1),
(2) Date: Jan. 2, 2019

(87) PCT Pub. No.: WO2018/006597
PCT Pub. Date: Jan. 11, 2018

(65) Prior Publication Data
US 2019/0255915 A1   Aug. 22, 2019

(30) Foreign Application Priority Data

Jul. 4, 2016 (CN) .......................... 2016 1 0514764

(51) Int. Cl.
B60H 1/32    (2006.01)
B60H 1/00    (2006.01)
(Continued)

(52) U.S. Cl.
CPC ....... B60H 1/3211 (2013.01); B60H 1/00485 (2013.01); B60H 1/00885 (2013.01);
(Continued)

(58) Field of Classification Search
CPC .. F25B 41/062; F25B 49/02; F25B 2700/171; F25B 2600/2513; F25B 2700/2106;
(Continued)

(56) References Cited

U.S. PATENT DOCUMENTS 5,568,732 A * 10/1996 Isshiki ..................... F24F 11/30
                                                          62/129

FOREIGN PATENT DOCUMENTS

CN    101539151    9/2009
CN    105299974    2/2016
(Continued)

*Primary Examiner* — Steve S Tanenbaum
(74) *Attorney, Agent, or Firm* — Jiwen Chen; Jacobson Holman PLLC

(57) ABSTRACT

Provided is a control method on electronic expansion valve in air conditioner, which comprises: obtaining a real-time running frequency of compressor, a real-time exhaust temperature and a real-time outdoor environment temperature as the compressor running; if the air conditioner working in cooling mode, using a first set rule or a second set rule to obtain an integral coefficient in which the selection is based on the comparison of the real-time outdoor environment temperature and a first set outdoor environment temperature; if the air conditioner working in heating mode, using a first set rule or a third set rule to obtain an integral coefficient in which the selection is based on the comparison of the real-time outdoor environment temperature and a second set (Continued)

outdoor environment temperature; performing a PID control on the electronic expansion valve by using an error of the difference between real-time exhaust temperature and a set target exhaust temperature. The method realizes an accurate and stable control on opening amount of electronic expansion valve in air conditioner.

8 Claims, 1 Drawing Sheet

(51) Int. Cl.
  *F25B 41/06*   (2006.01)
  *F25B 49/02*   (2006.01)
(52) U.S. Cl.
  CPC ......... *B60H 1/3216* (2013.01); *F25B 41/062* (2013.01); *F25B 49/02* (2013.01); *B60H 2001/3267* (2013.01); *F25B 2500/19* (2013.01); *F25B 2600/2513* (2013.01); *F25B 2700/171* (2013.01); *F25B 2700/2106* (2013.01); *F25B 2700/21152* (2013.01)
(58) Field of Classification Search
  CPC ........ F25B 2500/19; F25B 2700/21152; F24F 11/62; F24F 2110/00; F24F 11/30; F24F 2110/10; F24F 2110/12
  USPC .......................................................... 62/504
  See application file for complete search history.

(56) References Cited

FOREIGN PATENT DOCUMENTS

| | | |
|---|---|---|
| CN | 105423668 | 3/2016 |
| JP | 2011027287 | 2/2011 |

* cited by examiner

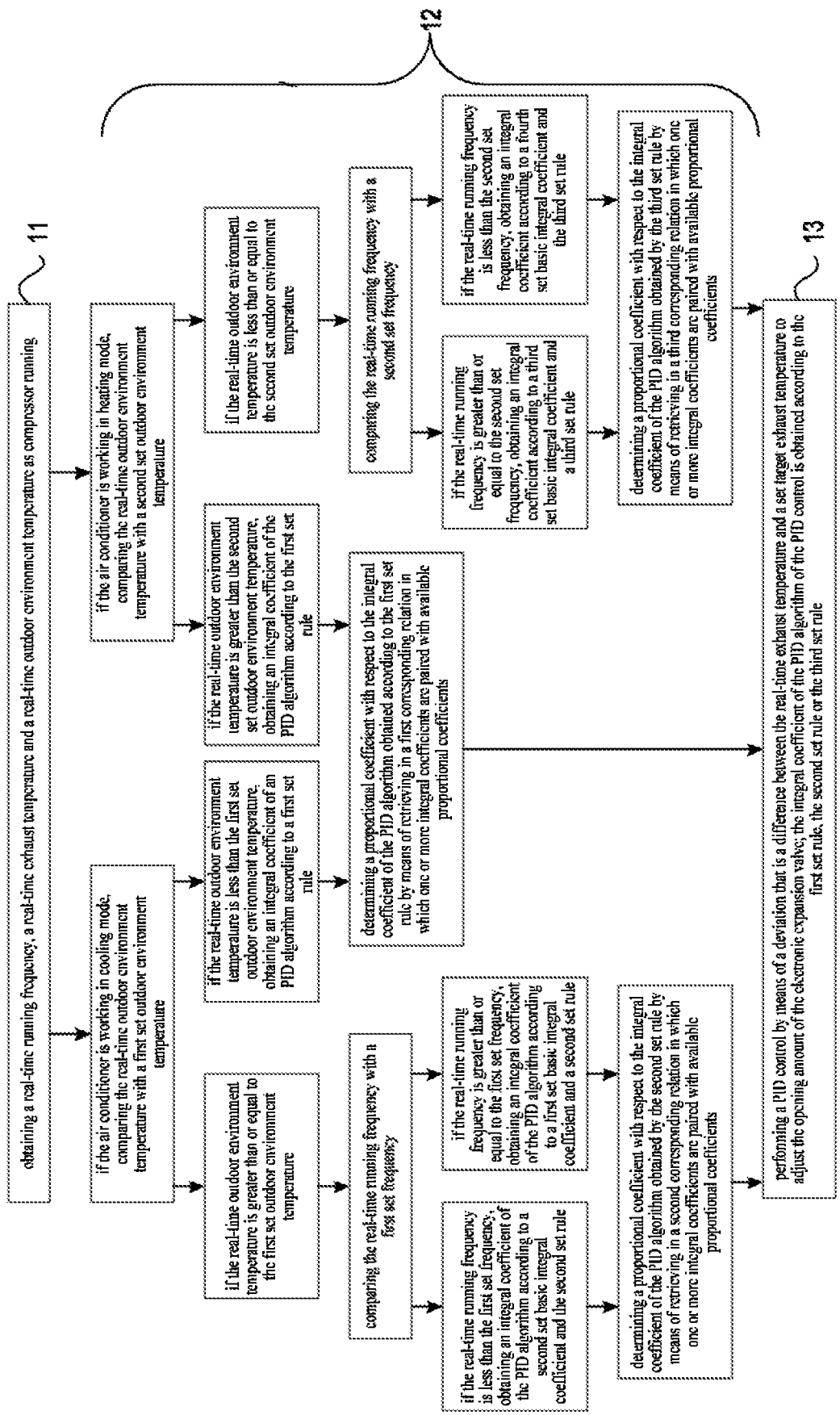

METHOD OF ADJUSTING ELECTRONIC EXPANSION VALVE OF AIR CONDITIONER

This is a U.S. national stage application of PCT Application No. PCT/CN2017/073139 under 35 U.S.C. 371, filed Feb. 9, 2017 in Chinese, claiming priority of Chinese Application No. 201610514764.1, filed Jul. 4, 2016, all of which are hereby incorporated by reference.

The present invention belongs to the technical field of Heating Ventilation Air Conditioning. In particular, the invention relates to the control of an air conditioner, more specifically, is a method of adjusting electronic expansion valve in air conditioner.

BACKGROUND

Electronic expansion valve is a kind of new control element commonly used in refrigerant circulation system of air conditioner. Electronic expansion valve opening is controlled to regulate the amount of refrigerant circulating in air conditioning system in order to meet the performance demand. Hence, the control of electronic expansion valve is critical for evaluating the energy efficiency ratio of the air conditioning system.

PID is an eligibly control technique for the opening of electronic expansion valve. The control action continuously calculates an error value as the difference between an actual output temperature and a desired output temperature of the compressor in air conditioning system, and applies a correction based on the PID algorithm to adjust the opening amount of the electronic expansion valve to a desired degree at a great rate. PID tuning improves the adjustment process efficiency, and it can bring the set point closer to the actual outdoor condition. But the proportional, integral and derivative terms of the typical PID algorithm applied on EEV are fixed, and the consequence is that the control could not properly satisfy varied air conditioner capacities or working conditions, which means the loop may not respond accurately. In this way, the energy efficiency ratio of the HVAC cooling device may be unable to reach the desired level.

SUMMARY OF THE INVENTION

An aspect of the present invention is to provide a method of adjusting electronic expansion valve in air conditioner. The improved PID control could enable the loop to respond accurately and stably, so that the energy efficiency of air conditioner refrigerant circulation could be improved as well.

In order to achieve the above object, the present invention is implemented by the following technical solutions:

A method of adjusting electronic expansion valve in air conditioner comprises:

obtaining a real-time running frequency, a real-time exhaust temperature and a real-time outdoor environment temperature as compressor running;

if the air conditioner is working in cooling mode, comparing the real-time outdoor environment temperature with a first set outdoor environment temperature; if the real-time outdoor environment temperature is less than the first set outdoor environment temperature, obtaining an integral coefficient of an PID algorithm according to a first set rule; if the real-time outdoor environment temperature is greater than or equal to the first set outdoor environment temperature, performing a process comprising:

Comparing the real-time running frequency with a first set frequency, if the real-time running frequency is greater than or equal to the first set frequency, obtaining an integral coefficient of the PID algorithm according to a first set basic integral coefficient and a second set rule; if the real-time running frequency is less than the first set frequency, obtaining an integral coefficient of the PID algorithm according to a second set basic integral coefficient and the second set rule; wherein the integral coefficient of the PID algorithm obtained according to the first set rule is greater than or equal to the integral coefficient of the PID algorithm obtained according to the second set rule; the first set basic integral coefficient is greater than the second set basic integral coefficient;

If the air conditioner is working in heating mode, comparing the real-time outdoor environment temperature with a second set outdoor environment temperature; if the real-time outdoor environment temperature is greater than the second set outdoor environment temperature, obtaining an integral coefficient of the PID algorithm according to a first set rule; if the real-time outdoor environment temperature is less than or equal to the second set outdoor environment temperature, performing a process comprising:

Comparing the real-time running frequency with a second set frequency, if the real-time running frequency is greater than or equal to the second set frequency, obtaining an integral coefficient according to a third set basic integral coefficient and a third set rule; if the real-time running frequency is less than the second set frequency, obtaining an integral coefficient according to a fourth set basic integral coefficient and the third set rule; wherein the integral coefficient of the PID algorithm obtained according to the first set rule is greater than or equal to the integral coefficient of the PID algorithm obtained according to the third set rule and the third set basic integral coefficient is greater than the fourth basic integral coefficient.

Then performing a PID control by means of a deviation that is a difference between the real-time exhaust temperature and a set target exhaust temperature on the opening amount of the electronic expansion valve; the integral coefficient of the PID algorithm of the PID control is obtained according to the first set rule, the second set rule or the third set rule.

Compared with the prior art, the advantages and positive effects of the present invention are: in the process as described above to control the electronic expansion valve opening amount, as the air conditioner working in cooling mode while the outdoor ambient temperature fitting with a high-temperature state or the air conditioner working in heating mode while the outdoor ambient temperature fitting with a low-temperature state, a smaller integral coefficient is selected in the PID algorithm, which limited adjustment range so as to reduce potential fluctuation of the exhaust temperature or oscillation of adjusted valve opening amount; as the air conditioner working in cooling mode while the outdoor ambient temperature fitting with a non-high-temperature state or the air conditioner working in heating mode while the outdoor ambient temperature fitting with non-low-temperature state, a larger integral coefficient is selected in the PID algorithm, which allows the adjustment to be flexible so as to improve response speed. Those refinements improve the accuracy and reliability of the control on the electronic expansion valve opening amount, which is advantageous to optimizing the energy efficiency ratio of the air conditioning refrigerant circulation. Moreover, the integral coefficient varies with respect to different running frequencies of compressor as the air conditioner is working in cooling mode and the outdoor ambient temperature fits with the high-temperature state or the air conditioner is working in heating mode and the outdoor ambient temperature fits with the low-temperature state, so that it could prevent potential fluctuation of the exhaust temperature or oscillation of the adjusted opening amount caused by variation of the running frequencies of the compressor. The consideration on both of compressor operating parameters and outdoor environment conditions makes the control method more widely available to varied air conditioner capacities or working conditions.

Other features and advantages of the present invention will become apparent referred to the detailed description.

BRIEF DESCRIPTION OF THE DRAWINGS

FIG. 1 is a flow chart of a method of adjusting electronic expansion valve in air conditioner according to one embodiment of the present invention;

DETAILED DESCRIPTION OF THE EMBODIMENT

For the purpose of promoting and understanding of the principles of the invention, reference will now be made to the embodiment illustrated in the drawings and specific language will be used to describe the same.

Shown in FIG. 1 is a flow chart of a method of adjusting electronic expansion valve in air conditioner according to one embodiment of the present invention. To be specific, FIG. 1 is a flow chart showing one control implementation of opening amount of an electronic expansion valve in air conditioning refrigerant circulation.

The control method on electronic expansion valve in air conditioner shown in FIG. 1 comprises the following steps:

Step 11: obtaining a real-time running frequency, a real-time exhaust temperature and a real-time outdoor environment temperature as compressor running;

In Step 11, the real-time running frequency indicates a sampled real-time speed frequency obtained as the compressor running based on a preset sampling rate. It is easy to read out the real-time speed frequency by a controller installed in the air conditioner because the controller is also used for driving the compressor; the real-time exhaust temperature indicates a sampled real-time exhaust temperature of the compressor obtained based on a preset sampling rate as the compressor running, which could be collected by a temperature sensor at the output of the compressor and read out by the controller; the real-time outdoor environment temperature indicates a sampled temperature of the ambient surrounding the compressor obtained based on a preset sampling rate, which could be collected by a temperature sensor on the outdoor unit of the air conditioner and read out by the air conditioner controller.

Step 12: if the air conditioner is working in cooling mode, obtaining an integral coefficient according to a first set rule or a second set rule, wherein the selection is based on the comparison of the real-time outdoor environment temperature and a first set outdoor environment temperature; if the air conditioner is working in a heating mode, obtaining an integral coefficient according to a first set rule or a third set rule, wherein the selection is based on the comparison of the real-time outdoor environment temperature and a second set outdoor environment temperature.

To be specific, if the air conditioner is working in cooling mode, comparing the real-time outdoor environment temperature with the first set outdoor environment temperature; if the real-time outdoor environment temperature is less than the first set outdoor environment temperature, obtaining an integral coefficient according to the first set rule; if the real-time outdoor environment temperature is greater than or equal to the first set outdoor environment temperature, performing a process comprising:

Comparing the real-time running frequency with a first set frequency, if the real-time running frequency is greater than or equal to the first set frequency, obtaining an integral coefficient of the PID algorithm according to a first set basic integral coefficient and a second set rule; if the real-time running frequency is less than the first set frequency, obtaining an integral coefficient of the PID algorithm according to a second set basic integral coefficient and the second set rule.

The first set outdoor environment temperature is a constant outdoor environment temperature preset and stored in advance and could be modified by authorization. The first set outdoor environment temperature represents a boundary value to separate a high-temperature outdoor environment condition from a non-high-temperature outdoor environment condition as the air conditioner working in cooling mode; for example, the first set outdoor environment temperature could be set as 38° C. The first set frequency is a constant outdoor environment temperature preset and stored in advance and could be modified by authorization. The first set frequency represents a boundary value to separate a low-frequency state of the compressor from a non-low-frequency state as the air conditioner working in cooling mode; for example, the first set frequency could be set as 30 Hz. Additionally, the first set basic integral coefficient, the second set basic integral coefficient and the second set rule are preset and stored in the air conditioner controller in advance and could be modified by authorization.

Moreover, the integral coefficient of the PID algorithm obtained according to the first set rule is greater than or equal to the integral coefficient of the PID algorithm obtained according to the second set rule; and the first set basic integral coefficient is greater than the second set basic integral coefficient. To be specific, regardless of whether the real-time running frequency is less than the first set frequency, if the outdoor environment temperature satisfies the non-high-temperature state as the air conditioner working in cooling mode, the integral coefficient obtained according to the first set rule is greater than or equal to the integral coefficient obtained according to the second set rule as the outdoor environment temperature satisfying the high-temperature state as the air conditioner working in cooling mode. If the real-time running frequency is greater than or equal to the first set frequency as the outdoor environment temperature satisfies the high-temperature state as the air conditioner working in cooling mode, it represents the compressor is working at a high-frequency state; under this circumstance, the first set basic integral coefficient configured to calculate the integral coefficient of the PID algorithm is greater than the second set basic integral coefficient used for calculating the integral coefficient of the PID algorithm as the compressor working in a low-frequency state that the real-time running frequency is less than the first set frequency.

If the air conditioner is working in a heating mode, comparing the real-time outdoor environment temperature with the second set outdoor environment temperature; if the real-time outdoor environment temperature is greater than the second set outdoor environment temperature, obtaining an integral coefficient of the PID algorithm according to the first set rule; if the real-time outdoor environment temperature is less than or equal to the second set outdoor environment temperature, performing a process comprising:

Comparing the real-time running frequency with a second set frequency, if the real-time running frequency is greater than or equal to the second set frequency, obtaining an integral coefficient of the PID algorithm according to a third set basic integral coefficient and a third set rule; if the real-time running frequency is less than the second set frequency, obtaining an integral coefficient of the PID algorithm according to a fourth set basic integral coefficient and the third set rule.

The second set outdoor environment temperature is a constant outdoor environment temperature preset and stored in advance and could be modified by authorization. The second set outdoor environment temperature represents a boundary value separating a low-temperature outdoor environment condition from a non-low-temperature outdoor environment condition as the air conditioner is working in heating mode; for example, the second set outdoor environment temperature could be set as 10° C. The second set frequency is a constant outdoor environment temperature preset and stored in advance and could be modified by authorization. The second set frequency represents a boundary value separating a low-frequency state of the compressor from a non-low-frequency state as the air conditioner is working in heating mode; for example, the second set frequency could be set as 35 Hz. Additionally, the third set basic integral coefficient, the third set basic integral coefficient and the third set rule are preset and stored in the air conditioner controller in advance and could be modified by authorization.

Moreover, the integral coefficient of the PID algorithm obtained according to the first set rule is greater than or equal to the integral coefficient of the PID algorithm obtained according to the third set rule; and the third set basic integral coefficient is greater than the fourth set basic integral coefficient. To be specific, regardless of whether the real-time running frequency is less than the second set frequency, if the outdoor environment temperature satisfies the non-high-temperature state as the air conditioner working in heating mode, the integral coefficient obtained according to the first set rule is greater than or equal to the integral coefficient obtained according to the second set rule as the outdoor environment temperature satisfying the high-temperature state as the air conditioner working in heating mode. If the real-time running frequency is greater than or equal to the second set frequency as the outdoor environment temperature satisfies a low-temperature state as the air conditioner working in heating mode, it represents the compressor is working at a high-frequency state; under this circumstance, the third set basic integral coefficient used for calculating the integral coefficient of the PID algorithm is greater than the fourth set basic integral coefficient used for calculating the integral coefficient of the PID algorithm as the compressor working in a low-frequency state that the real-time running frequency is less than the second set frequency.

Step 13: Performing the PID control on the electronic expansion valve opening amount by means of a deviation that is a difference between the real-time exhaust temperature and the target exhaust temperature.

After obtaining the integral coefficient according to the first set rule, the second set rule or the third set rule in Step 22, assigning the obtained integral coefficient to the PID algorithm and performing the control on electronic expansion valve opening.

The PID control process includes: calculating an error value between the real-time exhaust temperature which is obtained in the Step 11 and the set target exhaust temperature; performing the PID control by means of the error and the integral coefficient obtained in Step 12 to adjust the electronic expansion valve opening amount; wherein the set target exhaust temperature represents a desired exhaust temperature, which could be a preset value or a real-time value. For example, the set target exhaust temperature could be determined in real-time according to refrigerant flow rate or could be determined according to the running frequency of the compressor. Preferably, the set target exhaust temperature is determined according to the running frequency of the compressor. For example, a look-up table is preset and stored in which each available target exhaust temperature is paired with a running frequency range. During the PID control process, with the look-up table, an appropriate target exhaust temperature could be identified according to the known real-time running frequency of the compressor and used as the set target exhaust temperature. As a more preferred embodiment, the set target exhaust temperature $T_d$ and the real-time running frequency f are in a linear relation that satisfies the equation: $T_d=m*f+n$, wherein the parameters "m" and "n" are known constants which are stored in advance. The way of calculating the set target exhaust temperature by the linear relation could obtain the maximum energy efficiency ratio of air conditioner.

In the process as described above to control the electronic expansion valve opening amount, as the air conditioner working in cooling mode while the outdoor ambient temperature fitting with a high-temperature state or the air conditioner working in heating mode while the outdoor ambient temperature fitting with a low-temperature state, a smaller integral coefficient is selected in the PID algorithm, which limited adjustment range so as to reduce potential fluctuation of the exhaust temperature or oscillation of adjusted valve opening amount; as the air conditioner working in cooling mode while the outdoor ambient temperature fitting with a non-high-temperature state or the air conditioner working in heating mode while the outdoor ambient temperature fitting with non-low-temperature state, a larger integral coefficient is selected in the PID algorithm, which allows the adjustment to be flexible so as to improve response speed. Those refinements improve the accuracy and reliability of the control on the electronic expansion valve opening amount, which is advantageous to optimizing the energy efficiency ratio of the air conditioning refrigerant circulation. Moreover, the integral coefficient varies with respect to different running frequencies of compressor as the air conditioner is working in cooling mode and the outdoor ambient temperature fits with the high-temperature state or the air conditioner is working in heating mode and the outdoor ambient temperature fits with the low-temperature state, so that it could prevent potential fluctuation of the exhaust temperature or oscillation of the adjusted opening amount caused by variation of the running frequencies of the compressor. The consideration on both of compressor operating parameters and outdoor environment conditions makes the control method more widely available to varied air conditioner capacities or working conditions.

As a preferred embodiment, the first set rule in Step 12 is: the integral coefficient is a fifth set basic integral coefficient. With the first set rule, procedures for obtaining the integral coefficient comprises: assigning the fifth set integral coefficient into the integral coefficient variable of the PID algorithm, that is to say, if the real-time outdoor environment temperature satisfies the non-high-temperature state as the air conditioner working in cooling mode or the real-time outdoor environment temperature satisfies the non-low-temperature state as the air conditioner working in heating mode, the integral coefficient of the PID algorithm is a fixed value. That simple design for the PID controller could achieve a much greater effect.

After obtaining the integral coefficient in Step 12, assigning a differential coefficient variable of the PID algorithm in Step 13; there is no limit to the value of the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the first set rule in Step 12 further include: based on a first corresponding relation in which each of available proportional coefficients are paired with one or more integral coefficients, obtaining a proportional coefficient with respect to the integral coefficient of the PID algorithm obtained according to the first set rule. In this way, the proportional coefficient obtained in Step 13 is a value paired with the integral coefficient acquired according to the first set rule, which is retrieved from the first corresponding relation in which proportional coefficients associate to integral coefficients. More preferably, if the integral coefficient is the fifth set integral coefficient, the proportional coefficient is a first set proportional coefficient which is also a fixed value.

In Step 12, the second set rule as the air conditioner working in cooling mode preferably includes the following steps:

If the real-time running frequency is greater than or equal to the first set frequency, and the real-time outdoor environment temperature is greater than a third set outdoor environment temperature, the integral coefficient is the first set basic integral coefficient;

If the real-time running frequency is greater than or equal to the first set frequency, and the real-time outdoor environment temperature is less than or equal to the third set outdoor environment temperature, the integral coefficient $k_i$ satisfies $k_i=(f-\text{the third set frequency})*2+\text{the first set basic integral coefficient}$;

If the real-time running frequency is less than the first set frequency, and the real-time outdoor environment temperature is greater than the third set outdoor environment temperature, the integral coefficient is a second set basic integral coefficient;

If the real-time running frequency is less than the first set frequency, and the real-time outdoor environment temperature is less than or equal to the third set outdoor environment temperature, the integral coefficient $k_i$ satisfies $k_i=(f-\text{the third set frequency})*2+\text{the second set basic integral coefficient}$;

wherein, the third set outdoor environment temperature is greater than the first set outdoor environment temperature, and f represents the real-time running frequency.

As the air conditioner working in cooling mode, further determination is performed by using the third set outdoor environment temperature which is greater than the first set outdoor environment temperature, so as to form a temperature buffer range formed by the first set outdoor environment temperature and the third set outdoor environment temperature which is used to determine the actual ambient temperature. In the temperature buffer range, the integral coefficient is obtained from the linear relations $k_i=(f-\text{the third set frequency})*2+\text{the first set basic integral coefficient}$ or $k_i=(f-\text{the third set frequency})*2+\text{the second set basic integral coefficient}$, which could avoid the fluctuation of the electronic expansion valve opening amount caused by a sudden change of the integral coefficient.

Moreover, as described above, the integral coefficient of the PID algorithm acquired according to the first set rule in Step 12 is greater than or equal to the integral coefficient of the PID algorithm acquired according to the second set rule. Therefore, both of the first set basic integral coefficient and the second set basic integral coefficient are less than the fifth set integral coefficient and the maximum of the integral coefficient calculated by the linear formulas $k_i=(f-\text{the third set frequency})*2+\text{the first set basic integral coefficient}$ or $k_i=(f-\text{the third set frequency})*2+\text{the second set basic integral coefficient}$ is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned as the calculated value by the formula; and if the integral coefficient $k_i$ calculated according to either of the above formulas is greater than or equal to the fifth set integral coefficient, $k_i$ is assigned the fifth set integral coefficient.

In cooling mode, after obtaining the integral coefficient in Step 12, assigning a differential coefficient variable of the PID algorithm in Step 13; there is no limit to the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the second set rule in Step 12 further include: based on a second corresponding relation in which each of available proportional coefficients are paired with one or more integral coefficients, obtaining a proportional coefficient with respect to the integral coefficient of the PID algorithm obtained according to the second set rule. In this way, the proportional coefficient obtained in Step 13 is a value paired with the integral coefficient acquired according to the second set rule in Step 12, which is retrieved from the second corresponding relation in which proportional coefficients associate to integral coefficients. More preferably, the second corresponding relation is: if the integral coefficient is greater than or equal to a sixth set basic integral coefficient, the proportional coefficient is a second set proportional coefficient; if the coefficient is less than a sixth set basic integral coefficient, the proportional coefficient is a third set proportional coefficient, wherein the second set proportional coefficient is greater than the third set proportional coefficient.

In Step 12, the third set rule employed in heating mode preferably includes:

If the real-time running frequency is greater than or equal to the second set frequency, and the real-time outdoor environment temperature is less than a fourth set outdoor environment temperature, the integral coefficient is the third set basic integral coefficient;

If the real-time running frequency is greater than or equal to the second set frequency, and the real-time running frequency is greater than or equal to the fourth set outdoor environment temperature, the integral coefficient $k_i=(f-\text{the third set frequency})*1+\text{the third set basic integral coefficient}$;

If the real-time running frequency is less than the second set frequency, and the real-time outdoor environment temperature is less than the fourth set outdoor environment temperature, the integral coefficient is the fourth set basic integral coefficient;

If the real-time running frequency is less than the second set frequency, and the real-time outdoor environment temperature is greater than or equal to the fourth set outdoor environment temperature, the integral coefficient $k_i$ satisfies $k_i=$(f−the third set frequency)*1+the second set basic integral coefficient;

wherein, the fourth set outdoor environment temperature is less than the second set outdoor environment temperature, and f is the real-time running frequency.

Similarly, as the air conditioner is working in the heating mode, further determination is performed by using the fourth set outdoor environment temperature which is less than the second set outdoor environment temperature, so as to form a temperature buffer range formed by the second set outdoor environment temperature and the fourth set outdoor environment temperature which is used to determine the actual ambient temperature. In the temperature buffer range, the integral coefficient is obtained from the linear relations $k_i=$(f−the third set frequency)*1+the third set basic integral coefficient or $k_i=$(f−the third set frequency)*1+the fourth set basic integral coefficient, which could avoid the fluctuation of the electronic expansion valve opening amount caused by a sudden change of the integral coefficient, which may result from the running of compressor from the low-frequency state to the non-low-frequency state.

Moreover, as described above, the integral coefficient of the PID algorithm acquired according to the first set rule in Step 12 is greater than or equal to the integral coefficient of the PID algorithm acquired according to the third set rule. Therefore, both of the third set basic integral coefficient and the fourth set basic integral coefficient are less than the fifth set integral coefficient and the maximum of the integral coefficient calculated by the linear formulas $k_i=$(f−the third set frequency)*1+the third set basic integral coefficient or $k_i=$(f−the third set frequency)*1+the fourth set basic integral coefficient is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned as the calculated value by the formula; and if the integral coefficient $k_i$ calculated according to either of the above formulas is greater than or equal to the fifth set integral coefficient, $k_i$ is assigned the fifth set integral coefficient.

In heating mode, after obtaining the integral coefficient according to the third set rule in Step 12, assigning a value into the differential coefficient variable of the PID algorithm in Step 13; there is no limit to the differential coefficient, it could be a fixed value. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the third set rule in Step 12 further comprising: based on a third corresponding relation associating of each of available proportional coefficients to one or more integral coefficients, obtaining a proportional coefficient paired with the integral coefficient of the PID algorithm acquired according to the third set rule. In this way, the proportional coefficient obtained in Step 13 is a value paired with the integral coefficient acquired according to the third set rule, which results from the third corresponding relation associating of proportional coefficients to the of integral coefficients. More preferably, the third corresponding relation is: if the integral coefficient is greater than or equal to the seventh set integral coefficient, the proportional coefficient is a fourth set proportional coefficient; if the integral coefficient is less than the seventh set integral coefficient, the proportional coefficient is a fifth set proportional coefficient, wherein the fourth set proportional coefficient is greater than the fifth set proportional coefficient.

In those preferred embodiments, as the first set basic integral coefficient, the second set basic integral coefficient, the third set basic integral coefficient, and the fourth set basic integral coefficient described above, the third set frequency, the third set outdoor environment temperature, the fourth set outdoor environment temperature, the fifth set integral coefficient, the sixth set integral coefficient, the seventh set integral coefficient, the first corresponding relation, the second corresponding relation, the third corresponding relation, the first set proportional coefficient, the second set proportional coefficient, the third set proportional coefficient, the fourth set proportional coefficient, and the fifth set proportional coefficient are also fixed and stored in advance in the air conditioner controller, and could also be modified by authorization. The preferred values are: the third set frequency is 25 Hz, the third set outdoor environment temperature is 43° C., the fourth set outdoor environment temperature is 6° C., the first set basic integral coefficient is 6, the second set basic integral coefficient is 3, and the third set basic integral coefficient is 6, the fourth set the basic integral coefficient is 3, the fifth set integral coefficient is 12, the sixth set integral coefficient is 6, the seventh set integral coefficient is 6, the first set proportional coefficient is 200, the second set proportional coefficient is 200, the third set proportional coefficient is 100, the fourth set proportional coefficient is 200, and the fifth set proportional coefficient is 100.

It will nevertheless be understood that no limitation of the scope of the invention is thereby intended. Any alternations and further modification in the described embodiments, and any further applications of the principles of the invention as described herein are contemplated as would normally occur to one skilled in the art to which the invention relates.

What we claimed is:

1. A method of adjusting an electronic expansion valve in an air conditioner comprising:
    obtaining a real-time running frequency of a compressor of the air conditioner, a real-time discharge temperature and a real-time outdoor environment temperature as compressor is running;
    if the air conditioner is working in a cooling mode, comparing the real-time outdoor environment temperature with a first set outdoor environment temperature;
        if the real-time outdoor environment temperature is less than the first set outdoor environment temperature, obtaining an integral coefficient of a proportional-integral-derivative (PID) algorithm according to a first set rule;
        if the real-time outdoor environment temperature is greater than or equal to the first set outdoor environment temperature, performing a process comprising:
            comparing the real-time running frequency with a first set frequency;
            if the real-time running frequency is greater than or equal to the first set frequency, obtaining an integral coefficient of the PID algorithm according to a first set basic integral coefficient and a second set rule;
            if the real-time running frequency is less than the first set frequency, obtaining an integral coefficient of the PID algorithm according to a second set basic integral coefficient and the second set rule; wherein the integral coefficient of the PID algorithm obtained according to the first set rule is greater than or equal to the integral coefficient of the PID algorithm obtained according to the second set rule; the first set basic integral coefficient is greater than the second set basic integral coefficient;

if the air conditioner is working in a heating mode, comparing the real-time outdoor environment temperature with a second set outdoor environment temperature;
  if the real-time outdoor environment temperature is greater than the second set outdoor environment temperature, obtaining an integral coefficient of the PID algorithm according to the first set rule;
  if the real-time outdoor environment temperature is less than or equal to the second set outdoor environment temperature, performing a process comprising;
    comparing the real-time running frequency with a second set frequency;
    if the real-time running frequency is greater than or equal to the second set frequency, obtaining an integral coefficient according to a third set basic integral coefficient and a third set rule;
    if the real-time running frequency is less than the second set frequency, obtaining an integral coefficient according to a fourth set basic integral coefficient and the third set rule;
    wherein the integral coefficient of the PID algorithm obtained according to the first set rule is greater than or equal to the integral coefficient of the PID algorithm obtained according to the third set rule; the third set basic integral coefficient is greater than the fourth basic integral coefficient;

performing a PID control by means of a deviation that is a difference between the real-time discharge temperature and a set target discharge temperature to adjust the opening amount of the electronic expansion valve; the integral coefficient of the PID algorithm of the PID control is obtained according to the first set rule, the second set rule or the third set rule;

wherein the first set rule is as follows:
  the integral coefficient is a fifth set basic integral coefficient;
  the step of obtaining the integral coefficient according to the first set rule is assigning the fifth basic integral coefficient to the integral coefficient variable of the PID algorithm;

wherein the second set rule is as follows:
  if the real-time running frequency is greater than or equal to the first set frequency, and the real-time outdoor environment temperature is greater than a third set outdoor environment temperature, the integral coefficient is the first set basic integral coefficient;
  if the real-time running frequency is greater than or equal to the first set frequency, and the real-time outdoor environment temperature is less than or equal to the third set outdoor environment temperature, the integral coefficient $k_i$ satisfies $k_i=(f-\text{the third set frequency})*2+$ the first set basic integral coefficient;
  if the real-time running frequency is less than the first set frequency, and the real-time outdoor environment temperature is greater than the third set outdoor environment temperature, the integral coefficient is a second set basic integral coefficient;
  if the real-time running frequency is less than the first set frequency, and the real-time outdoor environment temperature is less than or equal to the third set outdoor environment temperature, the integral coefficient $k_i$ satisfies $k_i=(f-\text{the third set frequency})*2+$ the second set basic integral coefficient;
  wherein the third set outdoor environment temperature is greater than the first set outdoor environment temperature, and f represents the real-time running frequency; and wherein the third set rule is as follows:
  if the real-time running frequency is greater than or equal to the second set frequency, and the real-time outdoor environment temperature is less than a fourth set outdoor environment temperature, the integral coefficient is the third set basic integral coefficient;
  if the real-time running frequency is greater than or equal to the second set frequency, and the real-time outdoor environment temperature is greater than or equal to the fourth set outdoor environment temperature, the integral coefficient $k_i$ satisfies $k_i=(f-\text{the third set frequency})*1+$ the third set basic integral coefficient;
  if the real-time running frequency is less than the second set frequency, and the real-time outdoor environment temperature is less than the fourth set outdoor environment temperature, the integral coefficient is the fourth set basic integral coefficient;
  if the real-time running frequency is less than the second set frequency, and the real-time outdoor environment temperature is greater than or equal to the fourth set outdoor environment temperature, the integral coefficient $k_i$ satisfies $k_i=(f-\text{the third set frequency})*1+$ the second set basic integral coefficient; and
wherein the fourth set outdoor environment temperature is less than the second set outdoor environment temperature, and f is the real-time running frequency.

2. The method according to claim 1, after determining the integral coefficient of the PID algorithm according to the first set rule, further comprises:
  determining a proportional coefficient with respect to the integral coefficient of the PID algorithm obtained according to the first set rule by means of retrieving in a first corresponding relation in which one or more integral coefficients are paired with available proportional coefficients;
  wherein the value of the proportional coefficient of the PID algorithm of the PID control is the proportional coefficient with respect to the integral coefficient obtained according to the first set rule, which is retrieved from the first corresponding relation in which integral coefficients are paired with one or more proportional coefficients.

3. The method according to claim 1, wherein the first corresponding relation comprises:
  the integral coefficient is the fifth set integral coefficient and the proportional coefficient is a first set proportional coefficient.

4. The method according to claim 1, wherein: the third set frequency is 25 Hz, the third set outdoor environment temperature is 43° C., the fourth set outdoor environment temperature is 6° C., the first set basic integral coefficient is 6, the second set basic integral coefficient is 3, and the third set basic integral coefficient is 6, the fourth set the basic integral coefficient is 3, the fifth set integral coefficient is 12, the sixth set integral coefficient is 6, the seventh set integral coefficient is 6, the first set proportional coefficient is 200, the second set proportional coefficient is 200, the third set proportional coefficient is 100, the fourth set proportional coefficient is 200, and the fifth set proportional coefficient is 100.

5. The method according to claim 1, after determining the integral coefficient of the PID algorithm according to the second set rule, further comprises:
   determining a proportional coefficient with respect to the integral coefficient of the PID algorithm obtained by the second set rule by means of retrieving in a second corresponding relation in which one or more integral coefficients are paired with available proportional coefficients;
   wherein the value of the proportional coefficient of the PID algorithm of the PID control is the proportional coefficient with respect to the integral coefficient obtained according to the second set rule, which is retrieved from the second corresponding relation in which integral coefficients are paired with one or more proportional coefficients.

6. The method according to claim 5, wherein the second corresponding relation comprises:
   if the integral coefficient is greater than or equal to a sixth set basic integral coefficient, the proportional coefficient is a second set proportional coefficient; if the integral coefficient is less than the sixth set integral coefficient, the proportional coefficient is a third set proportional coefficient, wherein the second set proportional coefficient is greater than the third set proportional coefficient.

7. The method according to claim 1, after determining the integral coefficient of the PID algorithm according to the third set rule, further comprises:
   determining a proportional coefficient with respect to the integral coefficient of the PID algorithm obtained by the third set rule by means of retrieving in a third corresponding relation in which one or more integral coefficients are paired with available proportional coefficients; and
   wherein the value of the proportional coefficient of the PID algorithm of the PID control is the proportional coefficient with respect to the integral coefficient obtained according to the third set rule, which is retrieved from the third corresponding relation in which integral coefficients are paired with one or more proportional coefficients.

8. The method comprises according to claim 7, wherein the third corresponding relation comprises:
   if the integral coefficient is greater than or equal to a seventh set basic integral coefficient, the proportional coefficient is a fourth set proportional coefficient; if the integral coefficient is less than the seventh set integral coefficient, the proportional coefficient is a fifth set proportional coefficient, wherein the fourth set proportional coefficient is greater than the fifth set proportional coefficient.

* * * * *